Figure 1:
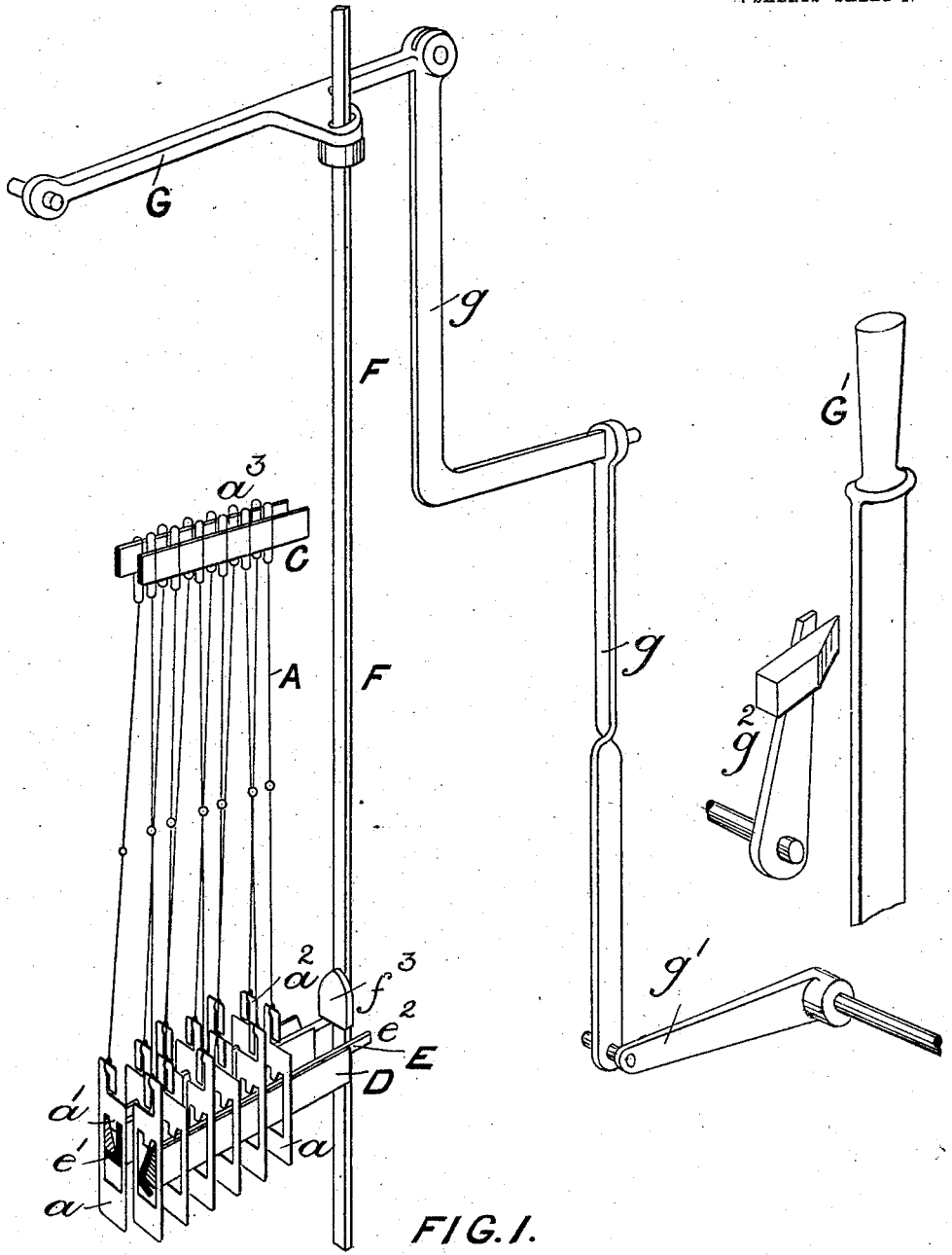

No. 851,040. PATENTED APR. 23, 1907.
W. R. STITT & A. J. DAVIDSON.
WARP STOP MOTION FOR LOOMS.
APPLICATION FILED MAY 10, 1904.

7 SHEETS—SHEET 2.

WITNESSES.    INVENTORS.

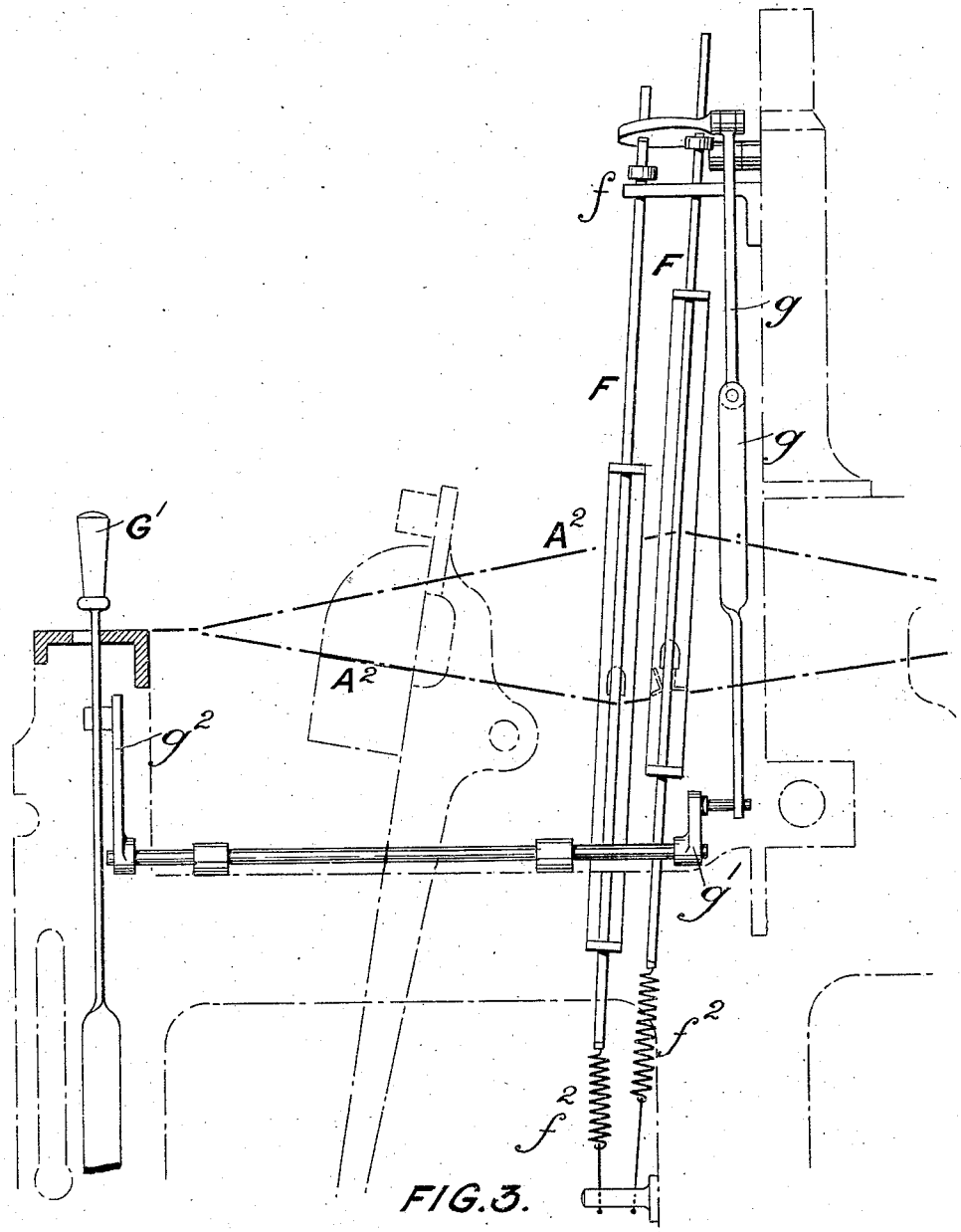

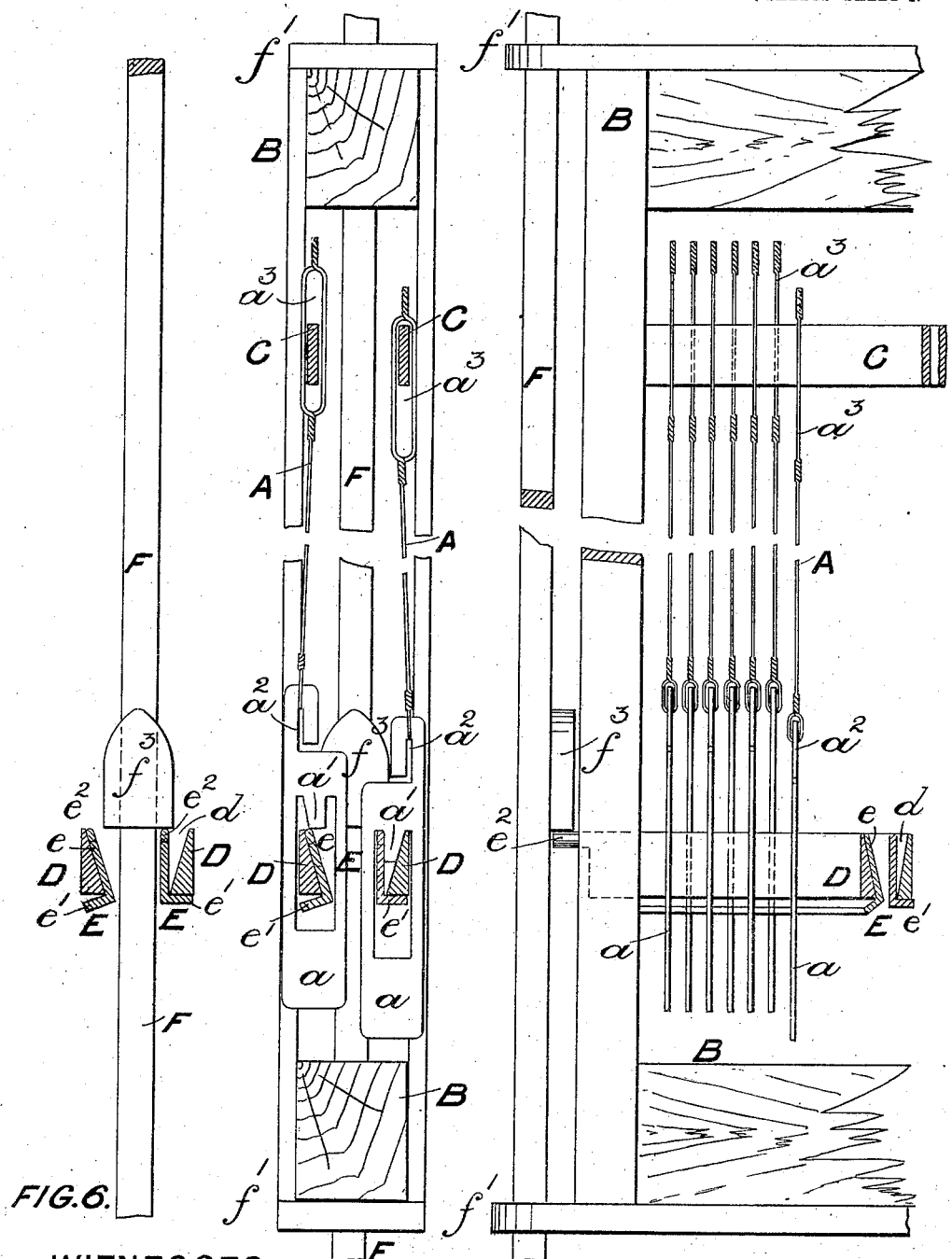

No. 851,040. PATENTED APR. 23, 1907.
W. R. STITT & A. J. DAVIDSON.
WARP STOP MOTION FOR LOOMS.
APPLICATION FILED MAY 10, 1904.
7 SHEETS—SHEET 5.
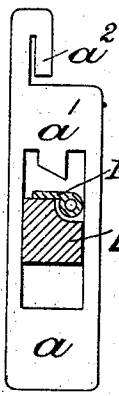
FIG.12.
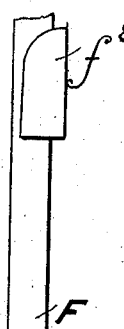
FIG.13. FIG.14.
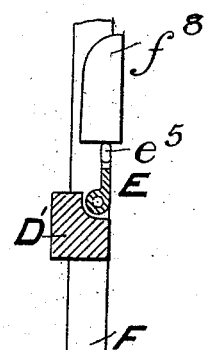
FIG.15.
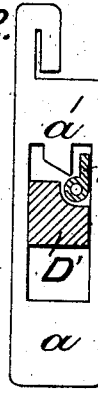
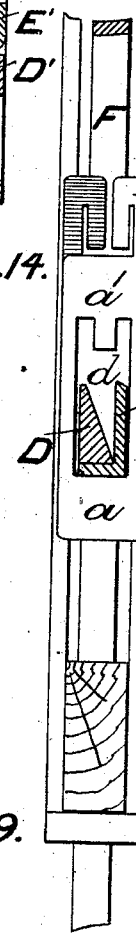
FIG.9.
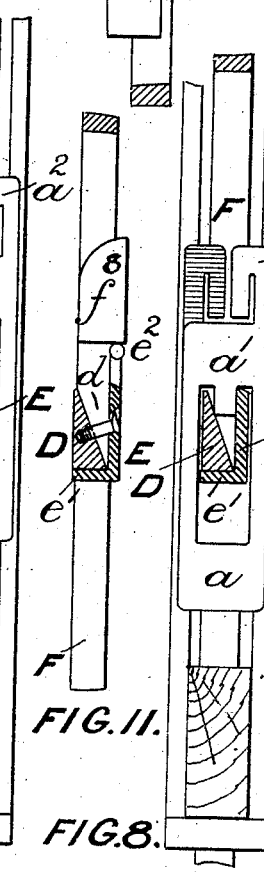
FIG.11. FIG.8.
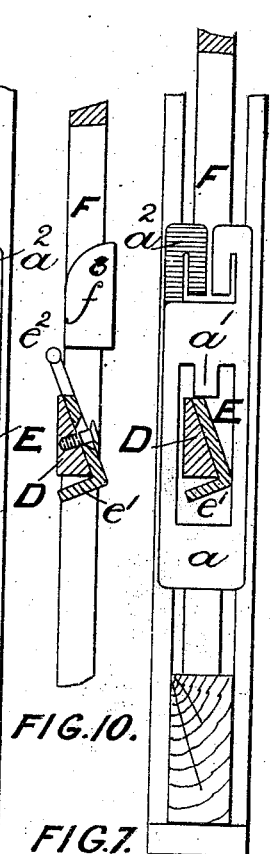
FIG.10. FIG.7.
WITNESSES.
E. Howard
Joseph Bates.
INVENTORS.
Wm. R. Stitt
A. J. Davidson
by J. O'Brien
att.

No. 851,040. PATENTED APR. 23, 1907.
W. R. STITT & A. J. DAVIDSON.
WARP STOP MOTION FOR LOOMS.
APPLICATION FILED MAY 10, 1904.
7 SHEETS—SHEET 6.
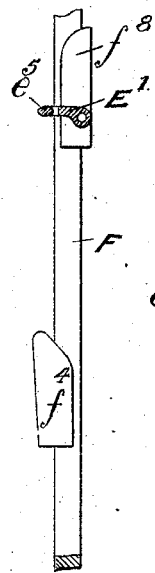
FIG.15ª
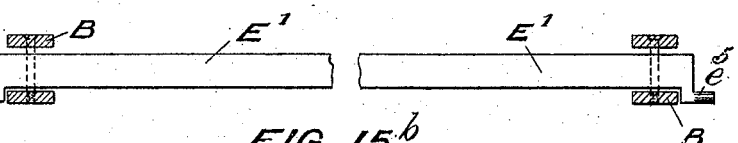
FIG.15ᵇ.
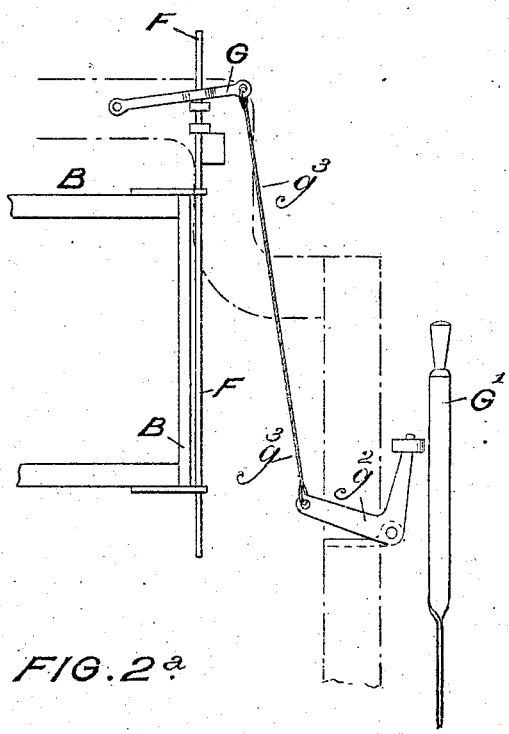
FIG.2ª
WITNESSES.
Joseph Bates.
E. Howard
INVENTORS.
W. R. Stitt
A. J. Davidson
by [signature] atty No. 851,040. PATENTED APR. 23, 1907.
W. R. STITT & A. J. DAVIDSON.
WARP STOP MOTION FOR LOOMS.
APPLICATION FILED MAY 10, 1904.

7 SHEETS—SHEET 7.

WITNESSES.
E. Howard.
Joseph Bates.

INVENTORS.
Wm R. Stitt
A. J. Davidson
by D. O'Brien
atty

UNITED STATES PATENT OFFICE.

WILLIAM RICHARD STITT, OF BELFAST, AND ARTHUR JOHNSTON DAVIDSON, OF CROSSGAR, IRELAND.

WARP STOP-MOTION FOR LOOMS.

No. 851,040.          Specification of Letters Patent.          Patented April 23, 1907.

Application filed May 10, 1904. Serial No. 207,328.

*To all whom it may concern:*

Be it known that we, WILLIAM RICHARD STITT and ARTHUR JOHNSTON DAVIDSON, British subjects and residents, WILLIAM RICHARD STITT of Belfast, County Antrim, Ireland, and ARTHUR JOHNSTON DAVIDSON of Cross-gar, County Down, Ireland, have invented certain new and useful Improvements in Warp Stop-Motions for Looms for Weaving, of which the following is a specification.

This invention is designed to provide a warp stop-motion for looms for stopping the loom on the failure or breakage of any one of the warp-threads which can be efficiently carried out mechanically without the application of electricity (though, if desired, an electrical connection may be adopted with the motion) and without placing upon the warp-threads any drop or weight.

The invention consists, essentially, in constructing the heddle-shaft with an oscillating bar which opens and closes a groove or slot at each lift and fall of the heddle, a vertical rod or bar suspended alongside the heddle-frame capable of being raised therewith by the end of the oscillating bar engaging a projection thereon, a series of levers and connecting rods or wires connecting the vertically-sliding rod with the setting-on handle or lever, and a metallic loop affixed to each heddle wire or cord embracing the bottom shaft and provided with a tongue pin or equivalent to engage the slot or groove when opened by the movement of the oscillating bar, causing it to remain open and throwing the end of the bar into the path of the projection on the vertical rod, and thereby raising it at the next lift of the heddle.

The invention will be fully described with reference to the accompanying drawings.

Figure 2:
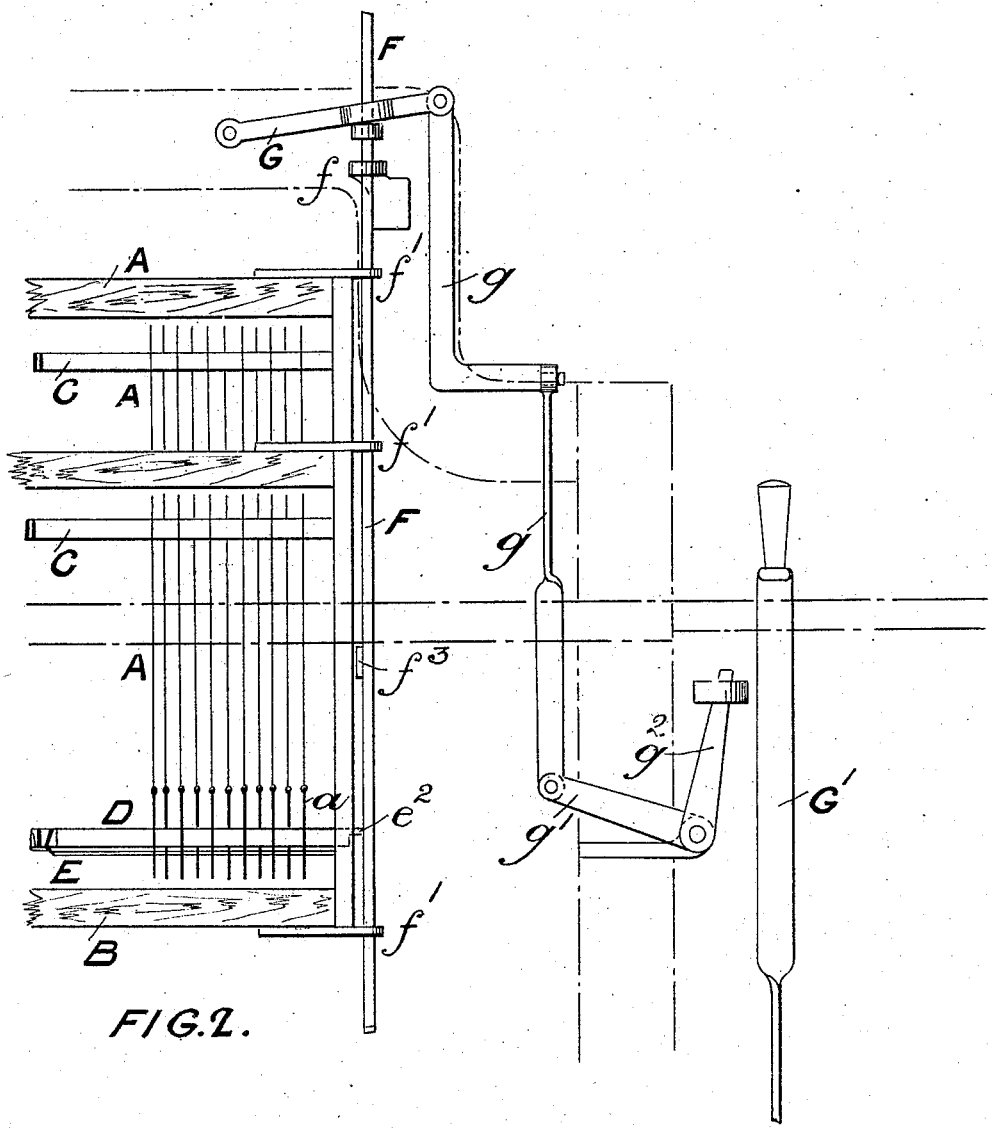
Figure 18:
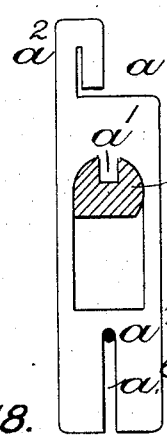
Figure 21:
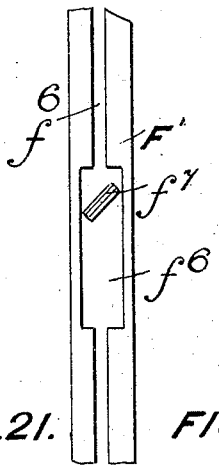
Figure 24:
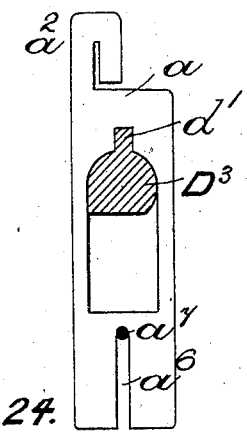
Figure 17:
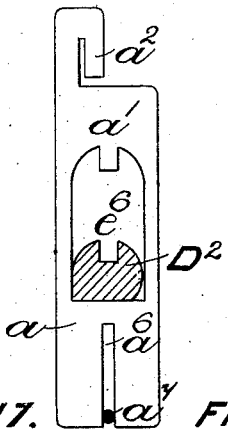
Figure 20:
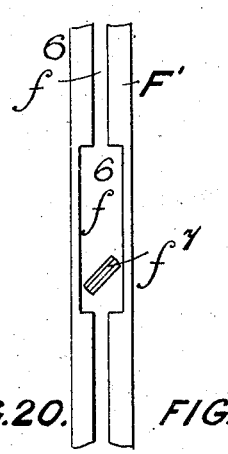
Figure 23:
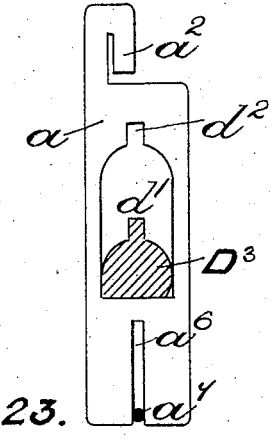
Figure 16:
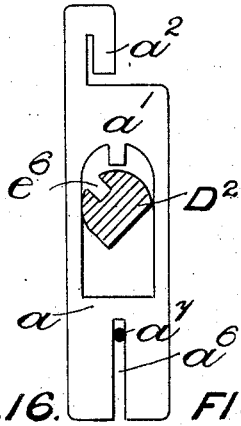
Figure 19:
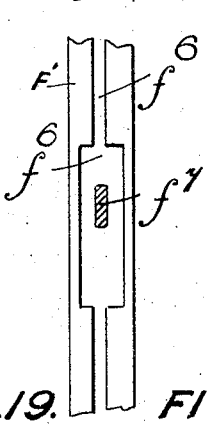
Figure 22:
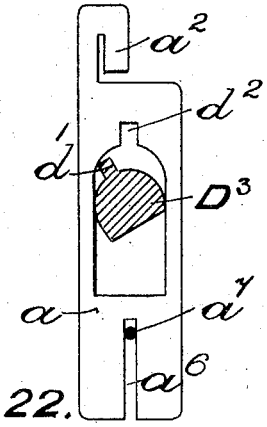

Figure 1 is a perspective view of the invention; Fig. 2, a front elevation of part of a loom, showing the position of the invention when applied thereto; Fig. 2$^a$, a front elevation of part of the invention, showing flexible connection $g^3$; Fig. 3, a side elevation of part of a loom, showing the position of the invention; Fig. 4, a front elevation of part of heddle-frame, drawn to enlarged scale; Fig. 5, a vertical section of same; Fig. 6, a diagrammatic section showing positions of oscillating bars E relatively to the cam projection $f^3$ on the rod F; Fig. 7, a sectional end elevation showing a modified construction; Fig. 8, a similar section showing a different position of the parts; Fig. 9, a similar section showing another position of the parts; Fig. 10, an end elevation showing rod F and cam projection $f^3$ when parts are in the position shown in Fig. 7; Fig. 11, an end elevation showing rod F and cam $f^3$ when parts are in position shown in Fig. 8; Fig. 12, a sectional end elevation showing another modified construction; Fig. 13, a similar sectional elevation showing the parts in a different position; Fig. 14, an end elevation showing rod F and cam projections $f^3$ and $f^4$ when the parts are in the position shown in Fig. 13; Fig. 15, an end elevation showing rod F raised by the projection on bar E' engaging the cam $f^8$ when the parts are in the position shown in Fig. 13; Fig. 15$^a$, an end elevation showing rod F and cam projections $f^8$ and $f^4$ when the parts are in the position shown in Fig. 12; Fig. 16, a sectional elevation showing another form of the bottom shaft D$^2$ swiveling upon its axis; Fig. 17, a sectional elevation showing another position of same; Fig. 18, a similar elevation showing another position; Fig. 19, an end elevation showing opposite end of the swiveling bottom shaft D$^2$ with sliding rod slotted to receive the end of the shaft in position corresponding with Fig. 16; Fig. 20, a similar end elevation with parts in position corresponding with Fig. 17; Fig. 21, a similar elevation with parts in position corresponding with Fig. 18; Fig. 22, a sectional elevation showing another form of swiveling bottom shaft D$^2$; Fig. 23, a similar elevation showing another position; Fig. 24, a similar elevation showing another position of same.

The heddle A may be of cord or wire; but we prefer to employ wire heddles, and the heddle-frames B are constructed in any suitable form to carry the top and bottom heddle-shafts C and D.

Each heddle A is constructed with a bottom loop $a$ of metal or stiff material to embrace the bottom shaft D, with an internal tongue or projection $a'$ capable of entering a groove or channel in the shaft or of maintaining the weight of the loop should such groove or channel be closed. The bottom loop $a$ may be formed in one with the heddle A, but we prefer to construct it of a separate stamping $a$ of thin sheet metal to be hung upon and suspended from the heddle by a hook-shaped slot $a^2$, formed in the upper end.

Each loop $a$ is preferably of the form shown, with the upper end cut away at one side and with the hook $a^2$ at the other side. The loops are reversed alternately as they are hung from the heddles A, so that the hook on one coincides with the space at the top of the adjacent ones at either side, leaving room for the heddle wire or cord, permitting the loops $a$ to lie close together without friction. The heddles are then alternately to one side and the other, so the eyelets for warps also pass freely.

The heddles A are formed with upper loops $a^3$ to pass around the upper shaft C in the usual way. In cotton-heddles the upper ends of the heddles are braided together as in the ordinary cotton-heddle, but the lower ends terminate individually in a knotless loop upon which the hook $a^2$ of the metal loop $a$ is hung. We at present prefer to place two top heddle-shafts C and two bottom heddle-shafts in each heddle-frame B, as shown in Figs. 4, 5, and 6 of the drawings. The invention is, however, equally applicable to the heddle-frame with a single bottom shaft, as illustrated in the other figures.

To the lower heddle-shaft D, which is preferably of angular shape, as shown, we affix a longitudinal oscillating bar E of angular section by a pin or screw passing loosely through the bar. (See Figs. 10 and 11.) The bar E is so placed relatively to the shaft D that when oscillated to one side by the heddle-loop $a$ groove or channel $d$ is formed between them, and when oscillated in the reverse direction such groove or channel is closed. The angle-bar E is so balanced that when the lower member $e'$ is not supported the upper member $e$ falls over to close the groove or channel $d$. When the lower member $e'$ of the angle-bar is supported, the channel or groove $d$ remains open to receive the internal tongue $a'$ of the loop $a$ at the lower end of the heddle A.

The oscillating bar E carries at one end a pin or projection $e^2$, eccentric to the axis about which it oscillates, the position of which is altered with each oscillation of the bar E.

At the side of the heddle-frame B is fitted or suspended a rod or bar F or its equivalent, which is capable of sliding up and down. The rod F is fitted and supported in brackets $f$, attached to the loom-frame, and also passes through brackets $f'$, affixed to the heddle-frame B to permit of the heddle-frame sliding up and down past the rod, which for the most part remains stationary, being held in normal position by a spring $f^2$ or by its own weight or by the weight of the lever G.

Upon the side of the rod F adjacent to the heddle-frame is fitted a cam or projecting plate or stop-washer $f^3$ or $f^8$ or other device, and into the line or path of this cam or projecting plate $f^3$ or $f^8$ the pin or projection $e^2$ on the oscillating bar E is brought when the channel between the bars E and D is opened. When the heddle-frame B rises with the pin or projection $e^2$ in this position, it engages the under side of the cam or projecting plate $f^3$ or $f^8$ and lifts or carries up the rod F with the heddle-frame B to the extent of the traverse of the frame.

Above the rod F is pivoted a lever or arm G, with which the rod F engages and by which it is lifted or raised to knock off or stop the loom. The lever G is by connecting-rods $g$ and bell-crank levers $g'$ connected with a striking-lever $g^2$, which when the rod F and lever G are lifted strike or knock off the setting on handle G'. Instead of connecting-rods and levers the lever G may be connected with the striking-lever $g^2$ or setting on handle G' by a wire or other flexible connection $g^3$. (See Fig. 2$^a$.)

In a modified construction the pivoted bar E', carried by the heald or heddle-shaft D', is pivoted eccentrically, so that its upper edge moves up and down or so that it may move from left to right (see Figs. 12 to 15,) with an arm or lever $e^5$ projecting past the sides of the heddle-frame at one or both ends. As the heddle-frame descends, the pivoted bar is raised or moved to one side by the pin-lever $e^5$, projecting from the end engaging a second cam or projection $f^4$ on the rod F. (See Fig. 14.) When the heddle-frame rises, the pivoted bar E' falls back to normal position out of the path of the cam or projection $f^8$. When the thread is broken, the tongue $a'$ of the stiff or metallic loop $a$ on the heddle cord or wire engages the pivoted bar when raised (see Fig. 13) and holds it up or to one side, the pin or lever $e^5$ engaging the cam projection $f^8$ on the bar F and raising it. (See Fig. 15.)

In another modification (see Figs. 16 to 21) instead of an angle-bar for opening and closing the grooves the bottom shaft D$^2$ may be pivoted and formed with a groove or slot $e^6$ along one side, which is rotated to a vertical position at each lift of the heddles, either by the loops $a$, as shown, or by a pin arm or cam. (See Fig. 14.) The shaft D$^2$ is pivoted at both ends to permit of it being rotated to bring the groove $e^6$ opposite the tongue $a'$ of the loop $a$. It works in the same manner as the angle-bar, the end $f^7$ fitting into a slot $f^6$ in the bar F', so that when the groove $e^6$ is at the top the end $f^7$ is across the slot $f^6$ and raises the bar with it. The metallic loop is also provided with a slot $a^6$, fitting over a rod $a^7$, to prevent it turning with the bar.

In another modification the pivoted bottom shaft D$^3$ is made with a tongue $d'$ to fit into a slot $d^2$ in the loop $a$, Figs. 22 to 24. This works in a similar manner to that previously described.

In operation (as applied to the lower shaft of the heddle) when the thread or yarn is unbroken and the heddle-frame descends the heddles A (wires or cords) are supported by the yarn $A^2$, holding up the stiff metal loops $a$ thereon and the projecting tongue $a'$ therein out of contact with the groove or channel $d$, formed between the shaft D and the angle-bar E. At the same time the loops support the lower member $e'$ of the pivoted angle-bar E and hold the groove $d$ open. Should a warp-thread break, its heddle A drops, causing the loop $a$ thereon also to drop upon the shaft and the tongue $a'$ enters the open groove or channel $d$, locking or holding the bar E in that position and preventing the channel closing when the weight or pressure is withdrawn on the upward movement of the heddle-frame. The operating pin finger or lever $e^2$ on the end of the bar E at the outside of the frame B engages the cam or projection $f^3$ or $f^8$ on sliding rod F as the heddle-frame rises, thereby lifting the rod F with it and knocking off or stopping the loom. If, however, all the warp-threads are intact, the bar E drops again to its normal position, withdrawing the operating pin or finger $e^2$ from the path of and out of contact with the cam $f^3$ on the sliding rod F.

What we claim as our invention, and desire to protect by Letters Patent, is—

1. In a loom for weaving, the combination with each heddle of a stiff metallic loop suspended therefrom and means to engage the stop mechanism and stop mechanism placed within it to engage therewith when the loop drops consequent upon the breakage of a warp-yarn for the purpose of stopping the loom substantially as described.

2. In a loom for weaving, the combination with the heddle-frame and heddles carried thereby of a stiff metallic loop suspended from each heddle provided with means to engage a bar placed within to engage with any one of the loops when allowed to drop consequent upon the breakage of a warp-yarn for the purpose of stopping the loom substantially as described.

3. In a loom for weaving, the combination with the heddle-frame and heddles carried thereby of a stiff metallic loop attached to each heddle provided with means to engage a bar placed within it and a rocking bar mounted in the heddle-frame placed inside the loop with which the loops engage when allowed to drop consequent upon the breaking of a warp-yarn substantially as described.

4. In a loom for weaving the combination with the heddle-frame and heddles carried thereby of a stiff loop provided with means to engage a bar attached to each heddle, means to engage any one of the loops when allowed to drop consequent upon the breakage of a warp-yarn and means connected thereto to stop the loom substantially as described.

5. In a loom for weaving the combination with the heddle-frame and heddles A carried thereby of a stiff loop provided with means to engage a rocking bar suspended from each heddle, a rocking bar placed inside the loops to engage any one of the loops when allowed to drop consequent upon the breakage of a warp-yarn and means connected thereto to stop the loom substantially as described.

6. In a loom for weaving the combination with the heddle-frame and heddles A carried thereby of a stiff loop suspended from each heddle, and provided with a central aperture, a rocking bar passing through the loops and mounted in the heddle-frame to engage any one of the loops when allowed to drop consequent upon the breakage of a warp-yarn and means connected thereto to stop the loom substantially as described.

7. In a loom for weaving the combination with the heddle-frame and heddles A of a stiff loop suspended from each heddle, a rocking bar mounted in the heddle-frame and passing through the loops to engage any one of the loops when allowed to drop consequent upon the breakage of a warp-yarn, a rod F provided with a cam therein which is raised by the heddle-frame when the rocking bar engages it, the knocking-off lever G' and the connecting levers and rods G $g$ $g'$ $g^2$ by which connection is made with the knocking-off lever G'.

8. In a loom for weaving the combination with the heddles A heddle-frame B upper shafts C and lower shafts D of stiff loops $a$ suspended from the heddles, rocking bar E passing through the loops provided with a lower member $e'$ threaded through the the bar, a rod F at the end of the heddle-loops, an eccentric projection $e^2$ on the end of frame a cam thereon affixed to the rod F with which the projecting end of the rocking bar engages a lever G resting against the rod F connecting-rods $g$ and $g'$ $g^2$ and a knocking-off lever G' substantially as described.

In witness whereof we have hereunto signed our names in the presence of two subscribing witnesses.

WILLIAM RICHARD STITT.
ARTHUR JOHNSTON DAVIDSON.

Witnesses:
   GEORGE MONTGOMERY ATKINSON,
   CHARLES GREENFIELD.